(57.)

JOHN DEUCHFIELD.

Improvement in Cooling and Drying Meal.

No. 4,712. Reissued Jan. 16, 1872.

WITNESSES. C. T. Cook. Otto Ed. Johnson.

INVENTOR. John Deuchfield. by Atty. George Johnson.

UNITED STATES PATENT OFFICE.

JOHN DEUCHFIELD, OF SYRACUSE, NEW YORK.

IMPROVEMENT IN COOLING AND DRYING MEAL.

Specification forming part of Letters Patent No. 19,984, dated April 20, 1858; reissue No. 4,712, dated January 16, 1872.

SPECIFICATION.

I, JOHN DEUCHFIELD, of Syracuse, in the county of Onondaga, and State of New York, have invented a new and Improved Arrangement of Means for Cooling and Drying Meal, of which the following is a specification, reference being had to the accompanying drawing, in which—

Figure 2:
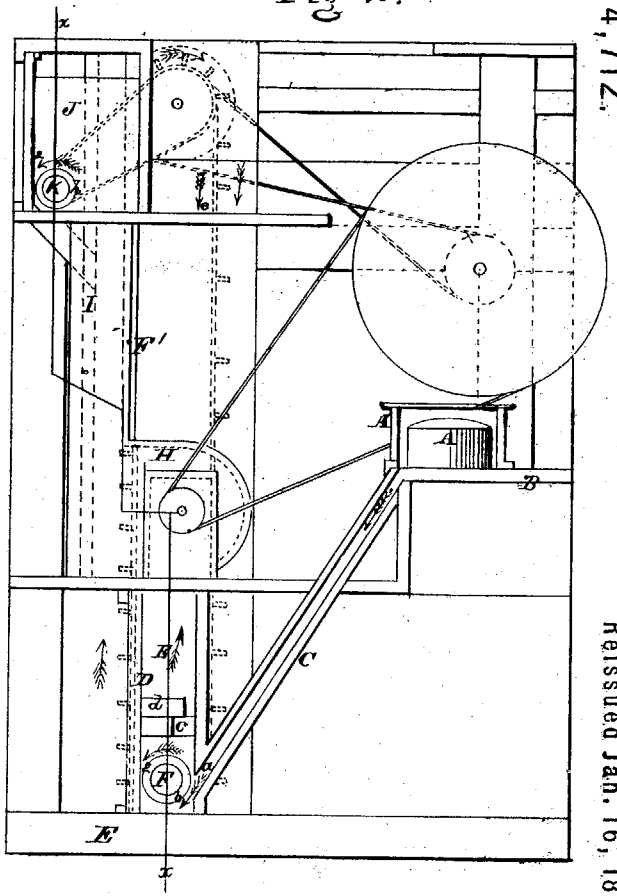
Figure 1:
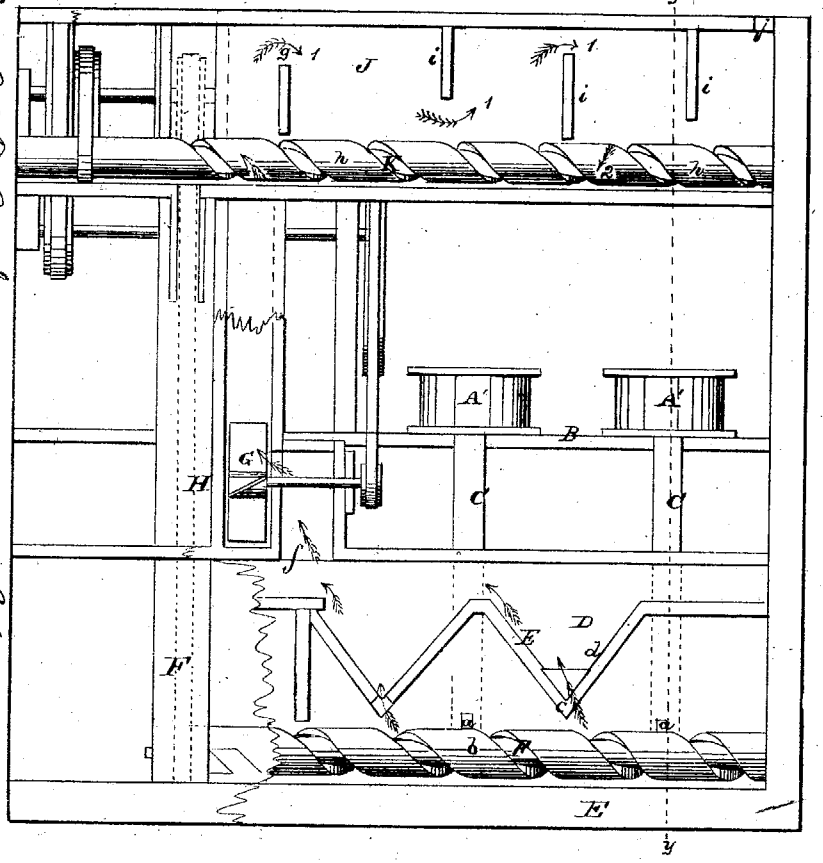

Figure 1 is a vertical section of my improvement taken in the line *x x*, Fig. 2. Fig. 2 is also a vertical section taken in the line *y y*, Fig. 1.

This invention consists in the peculiar arrangement of a suction-fan, conveyer or conveyers, and elevators, as hereinafter described, whereby the meal, during its passage from the grinding-stones to the bolts, is thoroughly dried and cooled within a limited space, the whole forming a simple and economical device.

A represents mill-stones, and A′ are the curbs. The stones are arranged in the ordinary way. B represents the bed on which the stones are placed. C represents the spouts which convey the meal from the stones; and D is a chest, which is placed horizontally on the flooring, E, and with which the blower ends of the spouts C communicate, as shown at *a* in both figures. Within the chest D a longitudinal shaft, F, is placed, said shaft having a spiral flanch, *b*, on it, as shown clearly in Fig. 1. The chest D is equal in length to the bed B, so that all the spouts C of the several stones A may communicate with it. Within the chest D there is also placed a zigzag partition, E, provided with openings *c*, having sides, *d*, and with one end of the chest D elevators F′ communicate, said elevators discharging their contents at *e*, as shown in Fig. 2. G is a fan, which is placed within a suitable box, H. The box H communicates with a spout, I, the lower end of which communicates with one end of the chest D, as shown at *f*. The upper end of the spout I communicates with one end of a chest, J, as shown at *g*. The chest J contains a longitudinal shaft, K, having a screw or spiral flanch, *h*, on it, as plainly shown in Fig. 1, and within the chest J a series of vertical plates, *i*, is placed and arranged, as clearly shown in Fig. 1, to form a zigzag passage, as indicated by arrows 1. The end of the chest opposite to that where the spout I communicates is provided with an opening, *j*. Both shafts, F K, are rotated by any proper means in the direction indicated by the arrows 2.

The operation is as follows: the meal passes from the stones A down the spouts C and into the lower part of the chest D, and is conveyed by the spirally-flanched shaft F into the elevators F′, the shaft F, which is a conveyer, moving the meal in the direction indicated by the arrows 3. The meal is carried up by the elevators and discharged at *e* directly into the bolts or into troughs, and may be conveyed by hopper-boys or any suitable conveying device into the bolts. While the meal is thus passed through the stones A, spouts C, and the chest D, a suction-blast is produced by the fan G, said blast absorbing the moisture or vapor which the meal contains, and which is heated or warmed by the friction of the stones A. The meal, therefore, is dried and cooled, and in consequence of the time consumed during its passage through the spouts C and chest D will be perfectly acted upon by the blast, so that all free moisture will be absorbed. A portion of the finer and lighter particles of flour will follow the blast, and will be ejected up through the spout I, and through the serpentine or winding passage formed by the parts *i*, and will settle in the outer end of the chest J, and be conveyed by the conveyer or flanched shaft K to a spout, *j*, through which it falls into the elevators F′, and unites with the meal which is received by the elevators direct from the chest D. This compound arrangement for operating on the meal while passing through the chest D and on the escaped flour in the chest J, returning the latter to the elevators, while it is extremely well adapted for large flouring-mills, running at high speeds and with a strong suction-blast, may not be either necessary or even practicable in all cases. When the grinding friction evolves only a moderate degree of heat the chest J and its apparatus may be dispensed with, for, the blast being moderated to correspond, so small a quantity of the fine flour will be drawn through the spout I that such flour may be ejected on the mill floor, and be disposed of in any convenient way so as to enter the bolts.

I do not claim forcing a current of air between a pair of millstones while the same is in operation for the purpose of keeping the stones in a cool state and preventing the heating of the grain, for such means, although not very efficient, have been previously used; but I am not aware that parts arranged as herein shown, so as to allow the meal to be subjected to the blast during its entire or nearly entire passage from the stones to the bolts, and insure the perfect drying and cooling of the meal, have been previously used.

I claim, therefore, as new, and desire to secure by Letters Patent—

1. The arrangement and combination of the suction-fan G and spout I with the meal-chest D, receiving the meal from the grinding-stones and provided with a conveyer-shaft F and elevator F′, substantially as and for the purpose set forth.

2. The arrangement and combination of the chests D J, shafts F K, elevators F′, fan G, and spout I, substantially as and for the purpose herein shown and described.

JOHN DEUCHFIELD.

Witnesses:
F. W. EVERS,
W. E. BURTON.